US008812963B2

(12) United States Patent
Whitmyer, Jr.

(10) Patent No.: US 8,812,963 B2
(45) Date of Patent: Aug. 19, 2014

(54) WEBSITE WITH USER COMMENTING FEATURE

(75) Inventor: Wesley W. Whitmyer, Jr., Stamford, CT (US)

(73) Assignee: WhitServe LLC, Stamford, CT (US)

( * ) Notice: Subject to any disclaimer, the term of this patent is extended or adjusted under 35 U.S.C. 154(b) by 356 days.

(21) Appl. No.: 13/330,394

(22) Filed: Dec. 19, 2011

(65) Prior Publication Data

US 2013/0159887 A1    Jun. 20, 2013

(51) Int. Cl.
*G06F 3/00*    (2006.01)

(52) U.S. Cl.
USPC ........................................... 715/760; 715/759

(58) Field of Classification Search
USPC ....................................................... 715/760
See application file for complete search history.

(56) References Cited

U.S. PATENT DOCUMENTS

| 6,182,078 | B1 | 1/2001 | Whitmyer, Jr. | |
|---|---|---|---|---|
| 7,840,413 | B2 * | 11/2010 | Yoshida et al. | 705/7.32 |
| 2012/0124458 | A1 * | 5/2012 | Cruzada | 715/205 |

* cited by examiner

*Primary Examiner* — Omar Abdul-Ali
(74) *Attorney, Agent, or Firm* — St. Onge Steward Johnston & Reens LLC

(57) ABSTRACT

A system and website for delivering services via the internet, including a server, a database including a plurality of data records corresponding to one or more clients, software executing on the server for generating and displaying reports of at least a portion of the data records to a client via the website, software executing on the server for displaying at least one input field via the website for receiving a comment pertaining to a first one of the data records, software executing on the server for storing a comment received via the input field, software executing on the server for displaying the comment via the website, and software executing on the server for managing access to the data records and comments, wherein viewing access to the comment via the website to is restricted to a first group of users and editing of the comment is restricted to a second group of users.

18 Claims, 13 Drawing Sheets

NEW PORTFOLIO REPORT

Portfolio reporting

First, select the Owners your NetDocket Portfolio Report should include; then, choose a Report type. On the Report results page you'll be able to title and export your report as an Excel file. Questions? Please contact us.

Make selections

Owner(s) Check boxes that apply. ALL NONE

- ☐ Doe, Jane
- ☐ Big Box Corporation
- ☐ Doe, John
- ☐ The Patent Company
- ☑ The Trademark Company

202

Show owner codes

Report type(s) Choose one:
- ○ Patents only
- ● Trademarks only
- ○ Combo Patents/Trademarks
- ○ Payment receipts & certificates

204

[ Run report ] — 206

Basic Trademarks Report

Total records found 12 | Display 100 per page

Your Basic Report

EDIT  EXPORT  PRINT  A-  A+

NOTE: Change the position of a column on the page by clicking and dragging the bar beneath its header. Sort by a specific column by clicking its header. Download this report in Excel by clicking on the green Export box. For information and details about a Property, simply click on its name. To make changes to your Report settings, click Edit in the toolbar above or use your browser's Back button.

| Owner | Property | ND Owner | ND Matter | Country | Status | Class |
|---|---|---|---|---|---|---|
| The Trademark Company | US Trademark 1 Class | T0002 | T0001A | US | Registered | 009 |
| The Trademark Company | Bosnia Trademark 1 Class | T0002 | T0001ABA | BA | Registered | 009 |
| The Trademark Company | US Trademark 2 classes | T0002 | T0002A | US | Registered | 008, 009 |
| The Trademark Company | Bosnia Trademark 2 classes | T0002 | T0002ABA | BA | Registered | 008, 009 |
| The Trademark Company | US Trademark 3 classes | T0002 | T0003A | US | Registered | 008, 009, 012 |
| The Trademark Company | Bosnia Trademark 3 classes | T0002 | T0003ABA | BA | Registered | 006, 003, 012 |
| The Trademark Company | US Trademark 4 Classes | T0002 | T0004A | US | Registered | 008, 013, 014, 015 |
| The Trademark Company | Bosnia Trademark 4 Classes | T0002 | T0004ABA | BA | Registered | 008, 013, 014, 015 |
| The Trademark Company | US Trademark 5 Classes | T0002 | T0005A | US | Registered | 008, 013, 014, 015, 016 |

WEBSITE WITH USER COMMENTING FEATURE

FIELD OF THE INVENTION

The invention relates to a website, and more specifically to a system and website with user commenting and comment management features.

BACKGROUND OF THE INVENTION

Various websites exist for providing services to consumers over the internet, such as websites for providing professional services. For example, Applicant's U.S. Pat. No. 6,182,078 describes a system for delivering professional services over the internet. The '078 patent describes a system and website which permits clients direct access to a docket database used to automate providing of professional services, and that automatically composes and sends a confirmation of the service performed to the client. Communications between the professional and the client may take place over the Internet, and the system can act on authorizations received from the client to perform or prepare documents necessary to perform desired professional services.

The invention of the '078 patent improves the speed, efficiency, and reliability of performing professional services for clients. However, as more and more of such services are being rendered over the internet, additional means of improving the provision of services online. Further desired are improved means to keep track of the services provided and to communicate information about the services within client companies.

SUMMARY OF THE INVENTION

Accordingly, it is an object of the present invention to provide a system and website with commenting features for annotating report entries with client comments and notes, and communicating and memorializing information within a client organization.

It is also desired to provide a website, such as a professional services website, with commenting features to permit users and service providers to directly annotate report entries with annotations or comments submitted via the website.

It is a further object of the invention to provide a website with commenting features which permit a user to enter a comment stored in one data record and selectively choose to have the same comment displayed in all members of a family of data records. It is a further object of the invention to provide such a system with the ability to restrict user's rights to edit and view comments, such as the ability to only edit/delete one's own comments but not others. Users can also selectively choose whether to publish comments or restrict display access to the creator or a subset of users.

It is a further object of the invention to provide a website with commenting features which is associated with a database management system. Comments entered via the website may be automatically stored and/or displayed in associated matters in the document management system.

These and other objectives are achieved by providing a system and website for delivering services via the internet, including a server, a database including a plurality of data records corresponding to one or more clients, software executing on the server for generating and displaying reports of at least a portion of the data records to a client via the website, software executing on the server for displaying at least one input field via the website for receiving a comment pertaining to a first one of the data records, software executing on the server for storing a comment received via the input field, software executing on the server for displaying the comment via the website, and software executing on the server for managing access to the data records and comments, wherein viewing access to the comment via the website to is restricted to a first group of users and editing of the comment is restricted to a second group of users.

In some embodiments, the first group of users consists of each a plurality of users at the client associated with the first one of the data records, and the second group of users consists of a single user who entered the comment in the input field.

Other objects of the present invention are achieved by provision of a method for receiving and displaying comments via a website, including the steps of generating, via software executing on a server, a report of at least a portion of a plurality of data records stored in a database, displaying, via software executing on the server, the report to a first user, displaying an input field for receiving comments pertaining to at least one of the data records listed in the report, receiving a first comment via the input field pertaining to a first one of the data records, storing the first comment received via the input field; displaying the first comment via the website, wherein the first comment is viewable by the first user and each of a plurality of second users associated with the same client, wherein the comment is editable by only the client user.

Other objects of the invention and its particular features and advantages will become more apparent from consideration of the following drawings and accompanying detailed description.

BRIEF DESCRIPTION OF THE DRAWINGS

FIG. 2 illustrates a user interface generated by the system.
FIG. 3 illustrates a user interface generated by the system.
FIG. 4 illustrates a user interface generated by the system.
FIG. 5 illustrates a user interface generated by the system.
FIG. 6 illustrates a user interface generated by the system.
FIG. 7 illustrates a user interface generated by the system.
FIG. 8 illustrates a user interface generated by the system.

DETAILED DESCRIPTION OF THE INVENTION

Figure 1A:
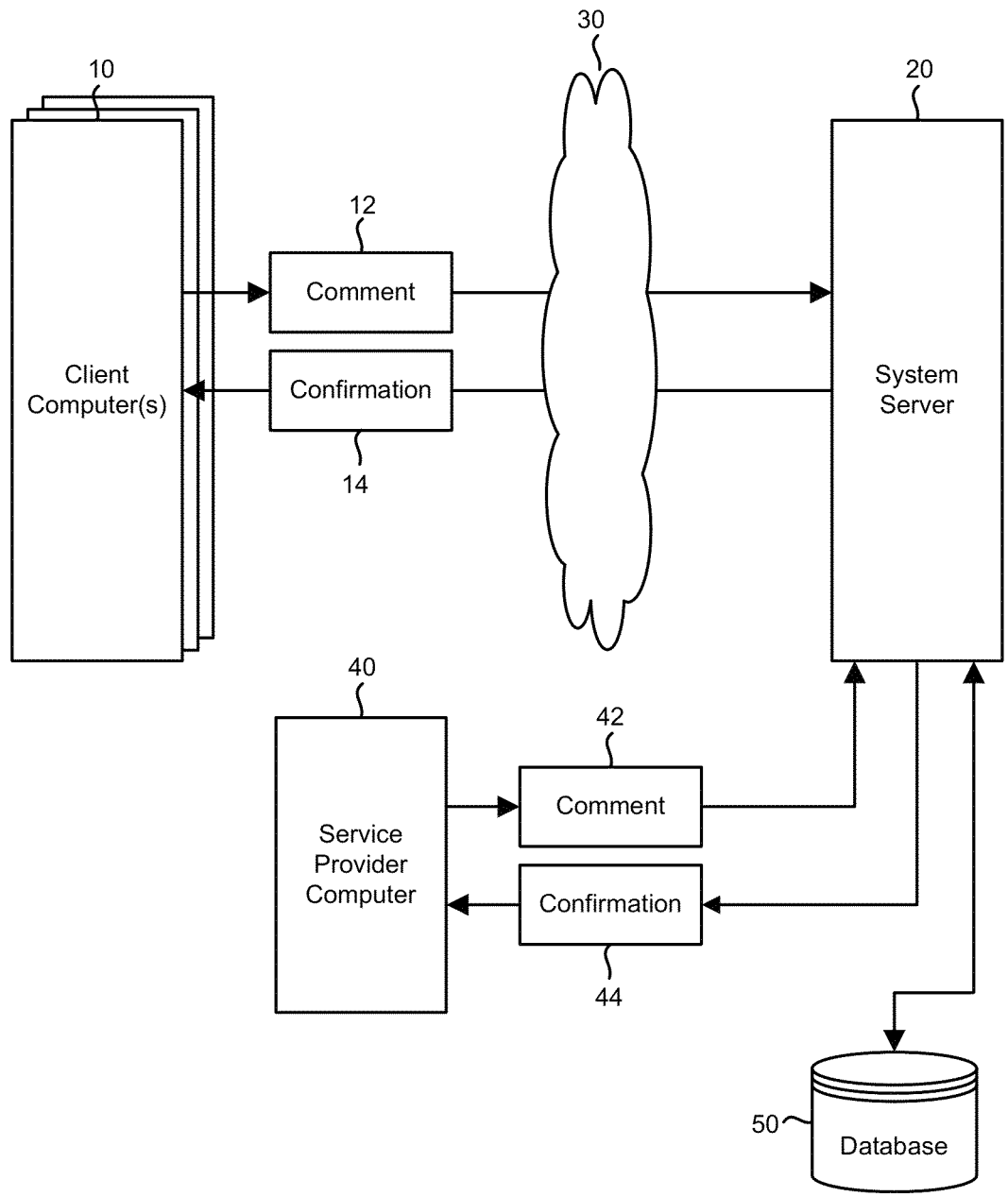
FIGS. 1A and 1B show an exemplary embodiment of the system according to the present invention.

FIG. 1A shows an exemplary embodiment of the system according to the present invention. The system includes a system server 20 including server hardware comprising at least one of a computer and one or more processors. The system server 20 includes one or more software modules (e.g., 22, 24) for displaying, publishing, and/or managing data on a website. The system server 20 further includes one or more databases 50 (e.g., embodied in at least one of a hard disk drive, flash memory drive, and/or storage array). The system server 20 is accessible via a communications network 30, such as the Internet, by a plurality of client computers 10. In particular, clients can submit notes and/or comments 12 to the system server 20, e.g., via the website, and receive confirmations 14.

The system further includes at least one service provider computer 40. In some embodiments, the system server 20 and the service provider computer 40 are one in the same and/or co-located. The service provider computer 40 can submit notes and/or comments 42 to the system server 20 and receive confirmations 44. The confirmations 44 may include confirmations of client submitted comments, or comments submitted by a service administrator via the service provider computer 40. Communications between the service provider computer 40 and the system server 20 may be via the website or via a backend interface.

Figure 1B:
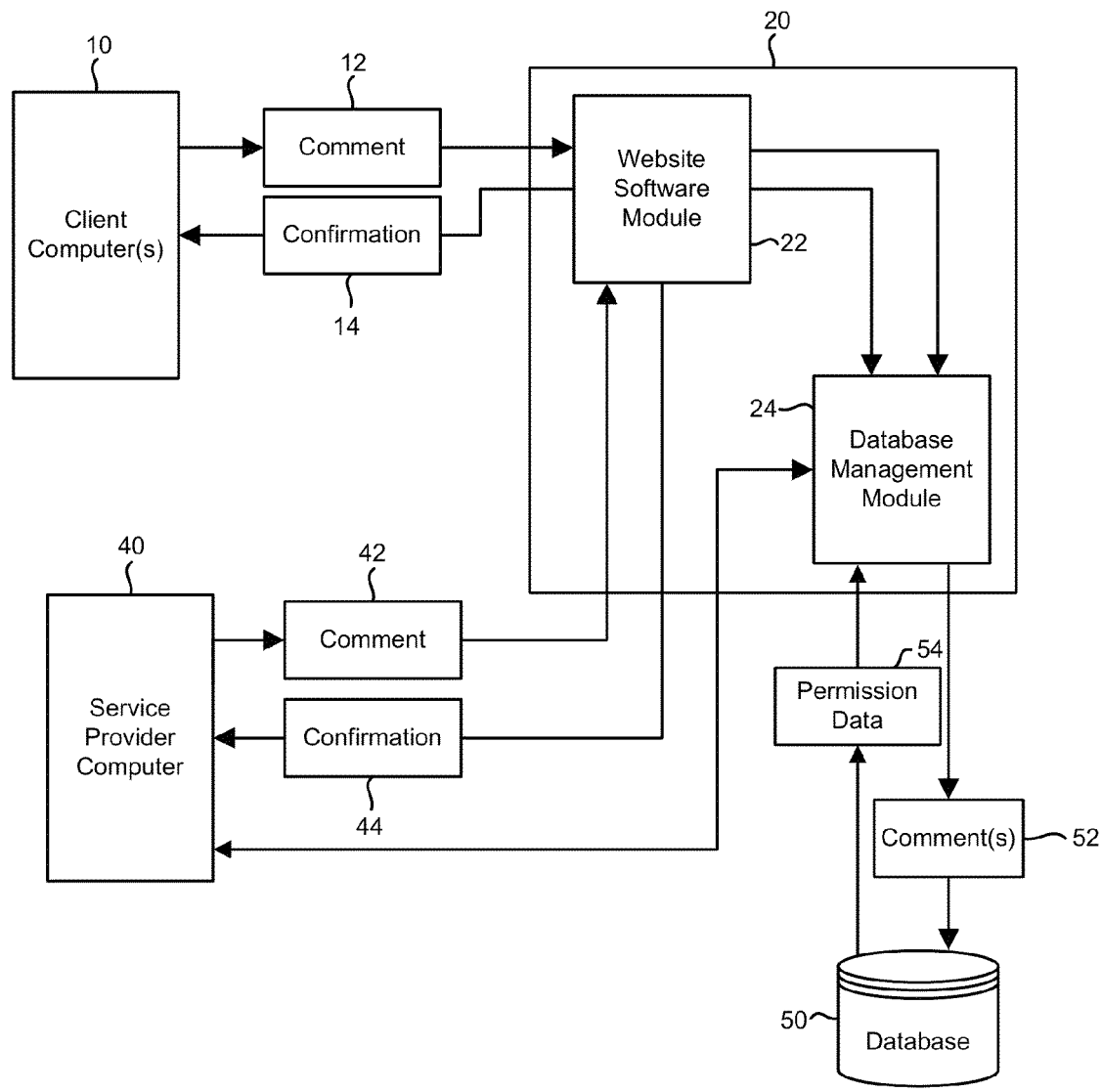

FIG. 1B shows another view of the system according to the present invention. The system server 20 includes one or more software modules 22 for displaying, publishing, and/or managing data on the website. In some embodiments, the system also includes a database management system ("DBMS") module 24. The DBMS 24 may be embodied in software executing on the system server 20 and/or the processor in the system server 20. In the exemplary embodiment, the DBMS 24 stores and manages storage of information about various matters serviced by the service provider. For example, the service provider may manage intellectual property ("IP") portfolios (e.g., including patents, trademarks, copyrights, designs, etc.) for a plurality of clients and pay periodic annuities and/or taxes for the various intellectual property assets. Clients may create and view custom reports of their IP portfolios and submit instructions to pay annuities and/or taxes via the website.

Each of the matters, in this example IP assets or family of assets, may have a matter profile stored in the database 50 by the DBMS 24. Comments 54 received concerning any of the IP assets may be stored in the database 50 and associated with the relevant matters by the DBMS 24. The DBMS 24 may also set and/or store appointments associated with matters. The comments and appointments are accessible in the DBMS 24 by service administrators via the service provider computer 40. The database 50 further includes permission data 54 associated with each client and/or each client user. The permission data 54 is received by the website software 22 (e.g., either directly or through the DBMS 24) from the database 50 and used by the website software 22 to determine which users have access to each of the particular client matters and comments.

FIG. 2 shows an exemplary webpage and/or user interface 200 provided by the system server 20. This webpage, and other webpages illustrated herein, are directed to a website for managing IP portfolios. However, one skilled in the art will understand that the present invention is applicable to many other types of websites. In FIG. 2, a Portfolio Reporting webpage 200 is shown in which a client can generate customized reports of IP by owner and IP or report type. The client logs in (e.g., with a user ID and password) and is presented with a report including a list of all client companies and/or owners associated with his/her user ID. The client can selectively choose one or more of the owners 202 (e.g., by owner name or owner code) and/or a report type 204 (e.g., Patents only, Trademarks only, Combo Patents/Trademarks, Payment receipts & certificates) to generate a report 206.

A webpage 300 showing the output from the report generation is shown in FIG. 3. The report can be viewed on the webpage 300 and can also be exported in various formats, such as Excel or PDF, for storage on the client computer 10. Each of the displays generated by the system further includes a print button to print the display. While viewing the various IP holdings on the webpage 300, a client may select one or more of the IP holdings and choose to submit a comment or note. The comments or notes can be associated with one or more of the IP holdings. IP holdings which already have at least one comment or note are identified with a note indicia 302.

Figure 4:
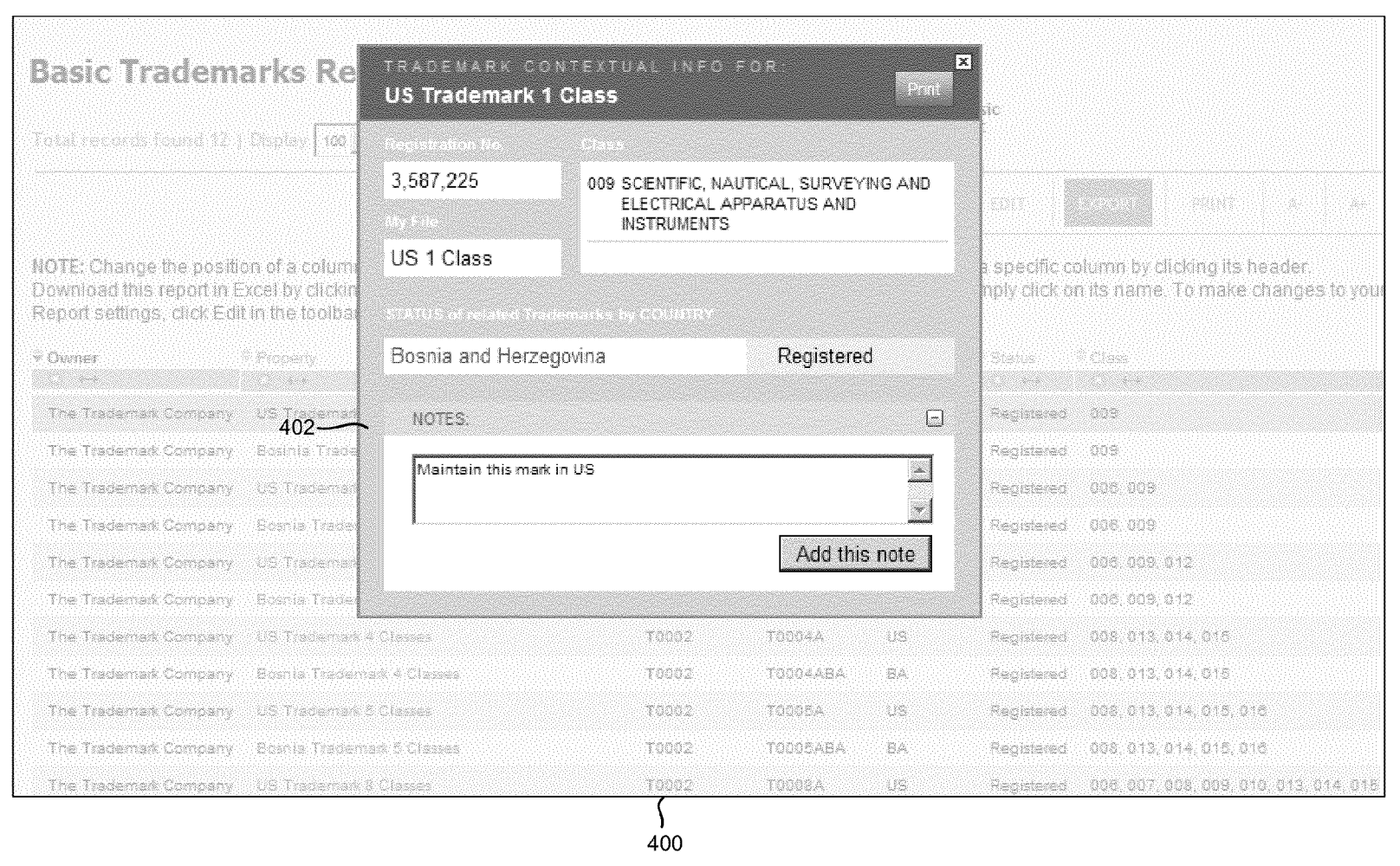

FIG. 4 shows a display 400 generated by the system with a pop up window 402. The window 402 is presented in response to a user clicking on or checking a box associated with the first one of the IP holdings shown in FIG. 3. The window 402 provides information about the particular IP holding and permits the entry of a comment or note. In the present example, the client submits a note indicating that the particular trademark should be maintained in the United States.

Figure 5:
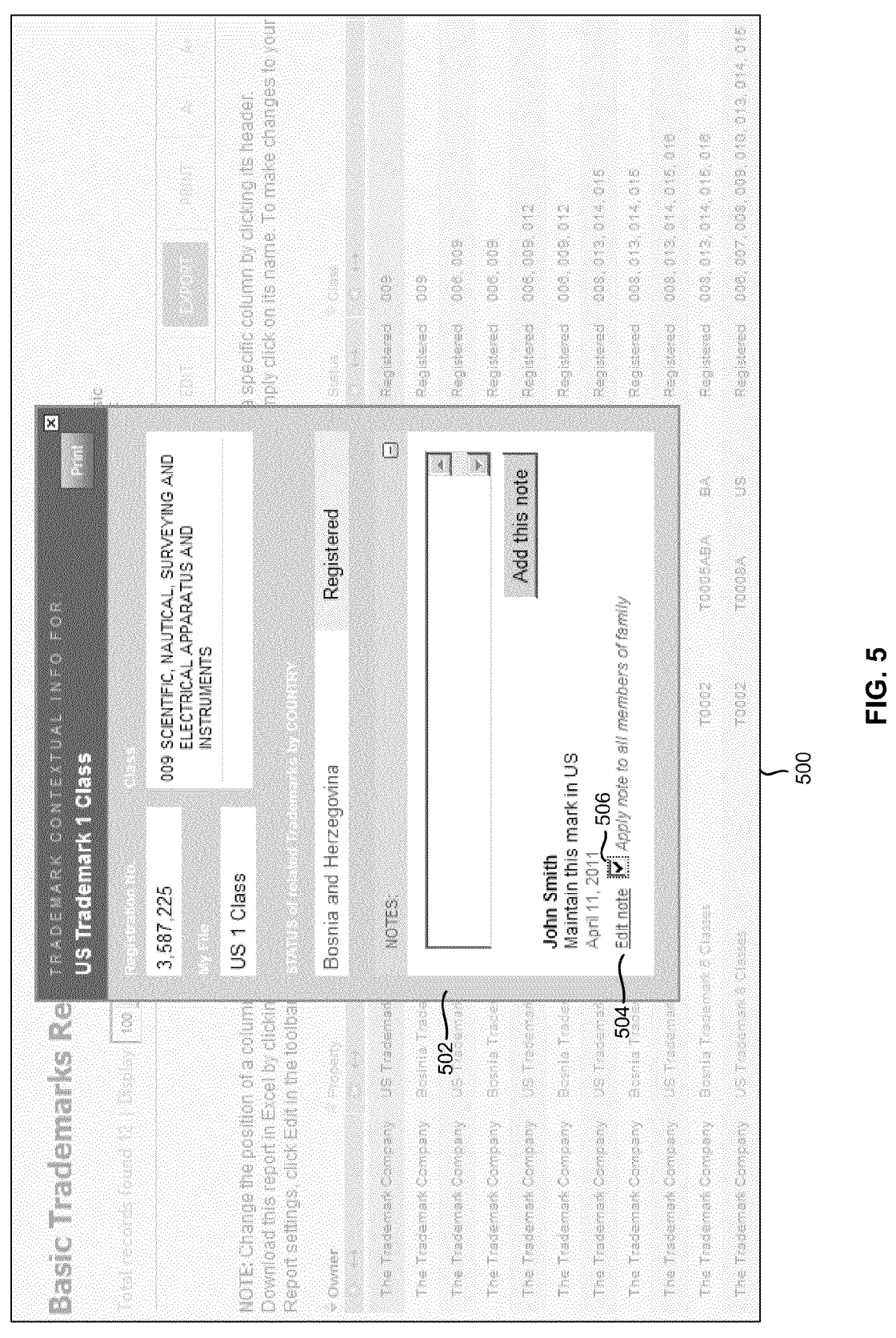
Figure 6:
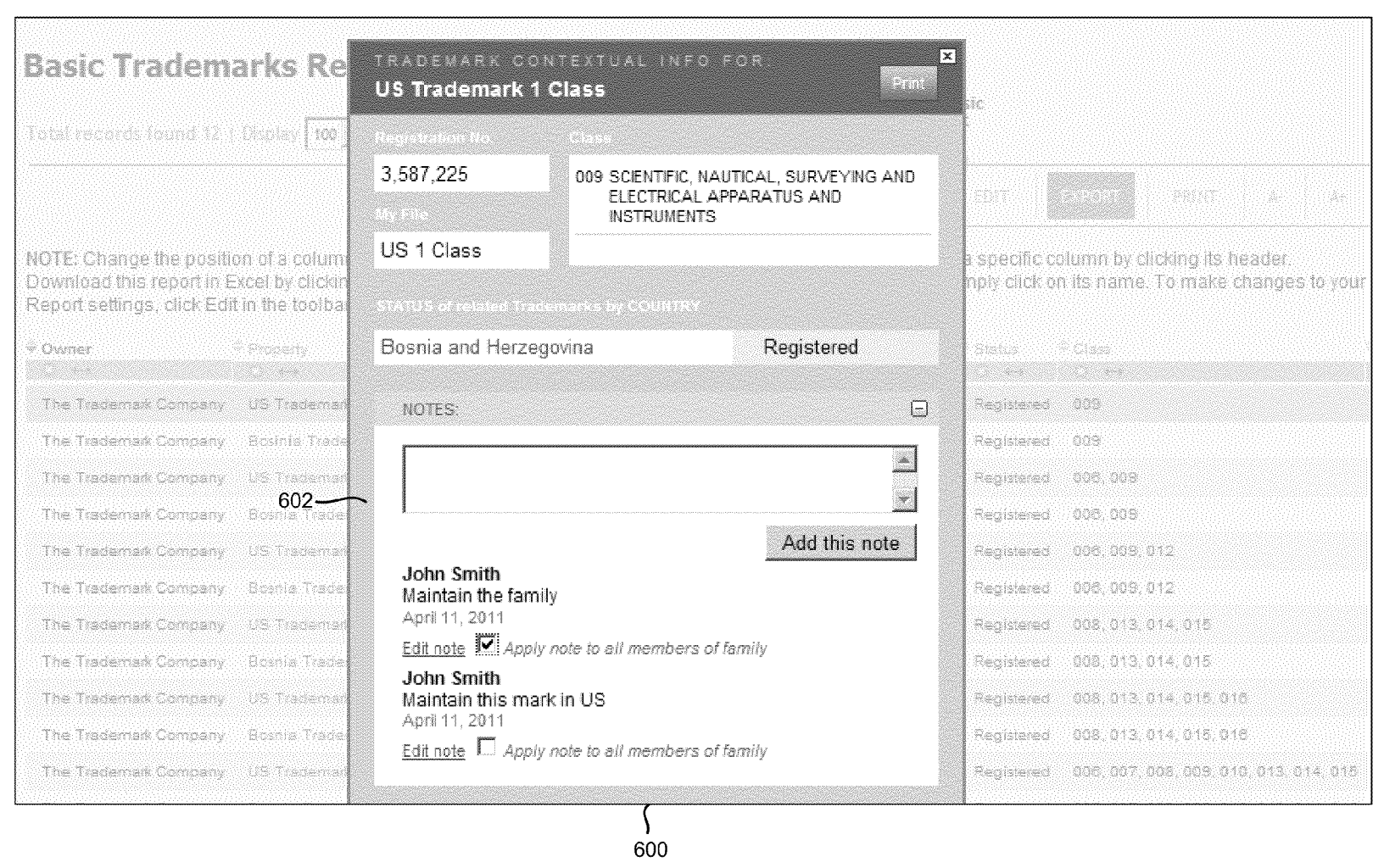

FIG. 5 shows a display 500 generated by the system with a confirmation window 502 indicating that the note has been entered on a given date. The confirmation window 502 permits the client to edit the note (e.g., via an edit button 504), or direct the system to apply the note to all members of the family. By clicking on a radio button or check box 506 in the confirmation window 502, the same note is applied to related trademarks in the same family. In one exemplary embodiment, the note is stored in the DBMS 24 in the first matter in which the note is entered, but is displayed in all of the family members associated with the matter via the website. In other embodiments, the note is separately stored in each of the family member matters. FIG. 6 illustrates another display 600 generated by the system with a confirmation window 602 indicating that the note has been applied to a family of trademarks.

The notes allow for client representatives to save annotations or reminders to oneself and/or the client company, e.g., regarding future actions to be taken with respect to particular matters (e.g., maintain, abandon, etc.), the status of the IP holding (e.g., pending, rejected, allowed, on appeal, etc.), the general subject matter of IP holding, ownership or assignment intentions, the litigation status of particular IP holdings, or any other note of comment desired by the client. Such notes are then viewable by other employees or representatives of the same client company upon logging in and generating a report including a matter in which a comment has been applied. The system is particularly useful for large companies with significant IP portfolios where employees in different offices around the world may be logging in to check statuses. In particular, the system enables inter-client communications about various matters via a website.

Once a comment or note is entered, the system may provide restrictions on future editing and viewing. In particular, the system server 20 may include a software module (e.g., 22, 24) for managing permissions using the permission data 54. In some embodiments, a note may only be edited or deleted by the particular user who creates the note (e.g., as identified by the log-in user ID). For example, a particular client may have several users authorized to log in to and access the website. While each client user may be permitted to view information about the IP holdings of the client, access may be restricted with regards to editing notes. As noted above, the system may only permit the particular client representative who created the note to edit or delete the note. In some embodiments, one or more client representatives with higher level access (e.g., administrator access) may also be permitted to edit or delete the note.

In one exemplary embodiment, permissions are managed by storing permission data 54 associated with each client user (e.g., based on log-in ID) and/or each client company. By managing the permissions, the communications can remain confidential with the client company and even within a subset of users at the client company. In some embodiments, the comments are only viewable by the client users and not by service administrators.

Figure 7:
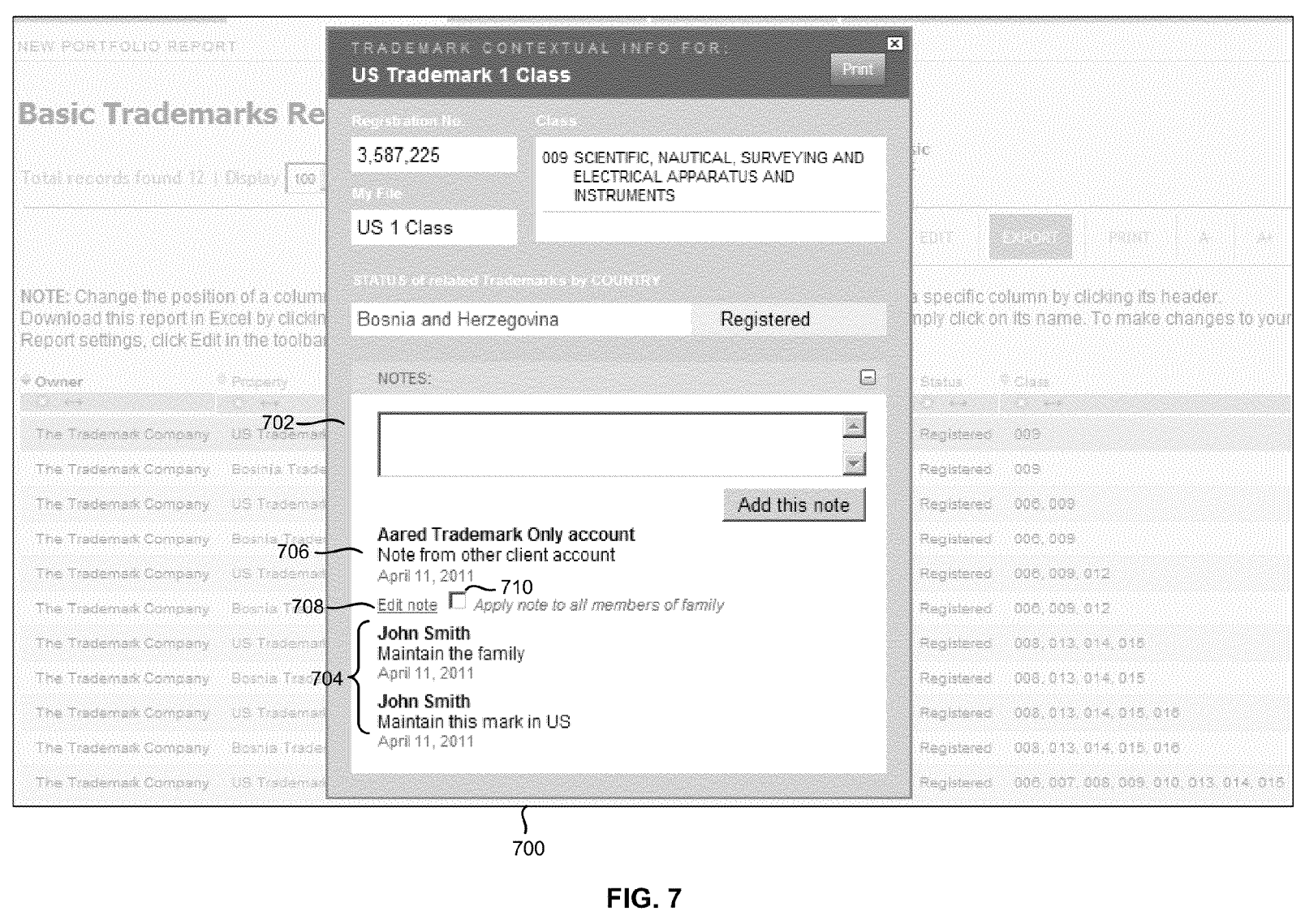

FIG. 7 shows another display 700 generated by the system with a confirmation window 702 indicating that another note has been entered on a given date. In this example, the note has been entered by a different user with access to the same matter. For example, this may one of many individuals at the same client company with a separate log-in ID. As shown, the user who subsequently accesses the matter can view the previous comments 704, but cannot edit them. However, the confirmation window 702 permits the client to edit the note which he/she entered (e.g., via an edit button 704), or direct the system to apply the same note to all members of the family. By clicking on a radio button or check box 710 in the confirmation window 702, the note is applied to related trademarks in the same family.

Figure 8:
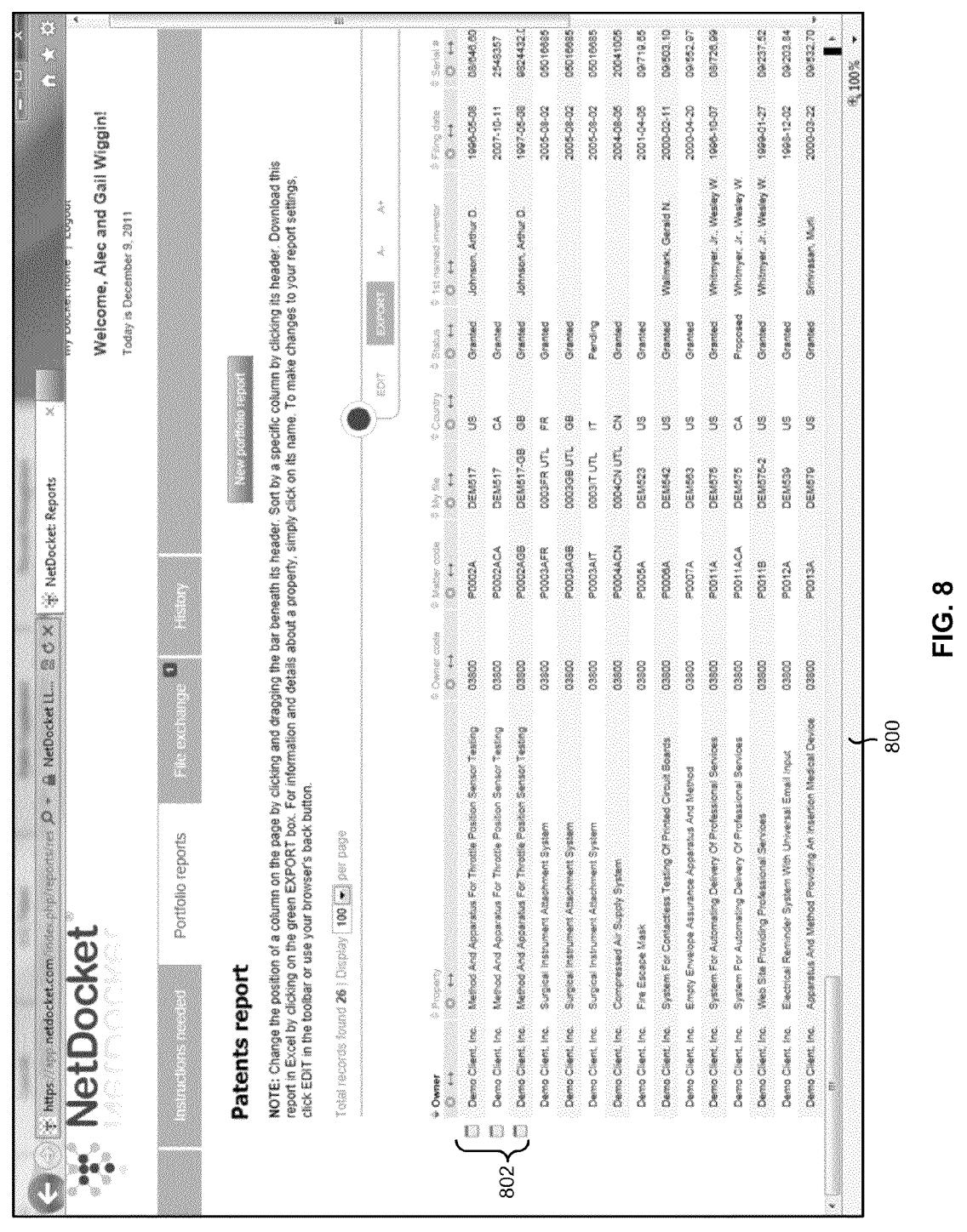

FIG. 8 shows another webpage 800 including a report generated by the system. In this exemplary embodiment, a report of patent matters is shown. The report includes information about each patent including an owner, a title, a matter code, jurisdiction or country, serial number, etc. Additional information, such as a summary or abstract, may be viewed by clicking on one of the patents in the list. While viewing the various IP holdings, a client may select one or more of the IP holdings and choose to submit a comment or note. The comments or notes can be associated with one or more of the IP holdings. IP holdings which already have at least one comment or note associated with it are identified with a note indicia 802. The note indicia 802 appears in reports generated by those who have access to the particular IP holding and permission to view the comment.

Figure 9:
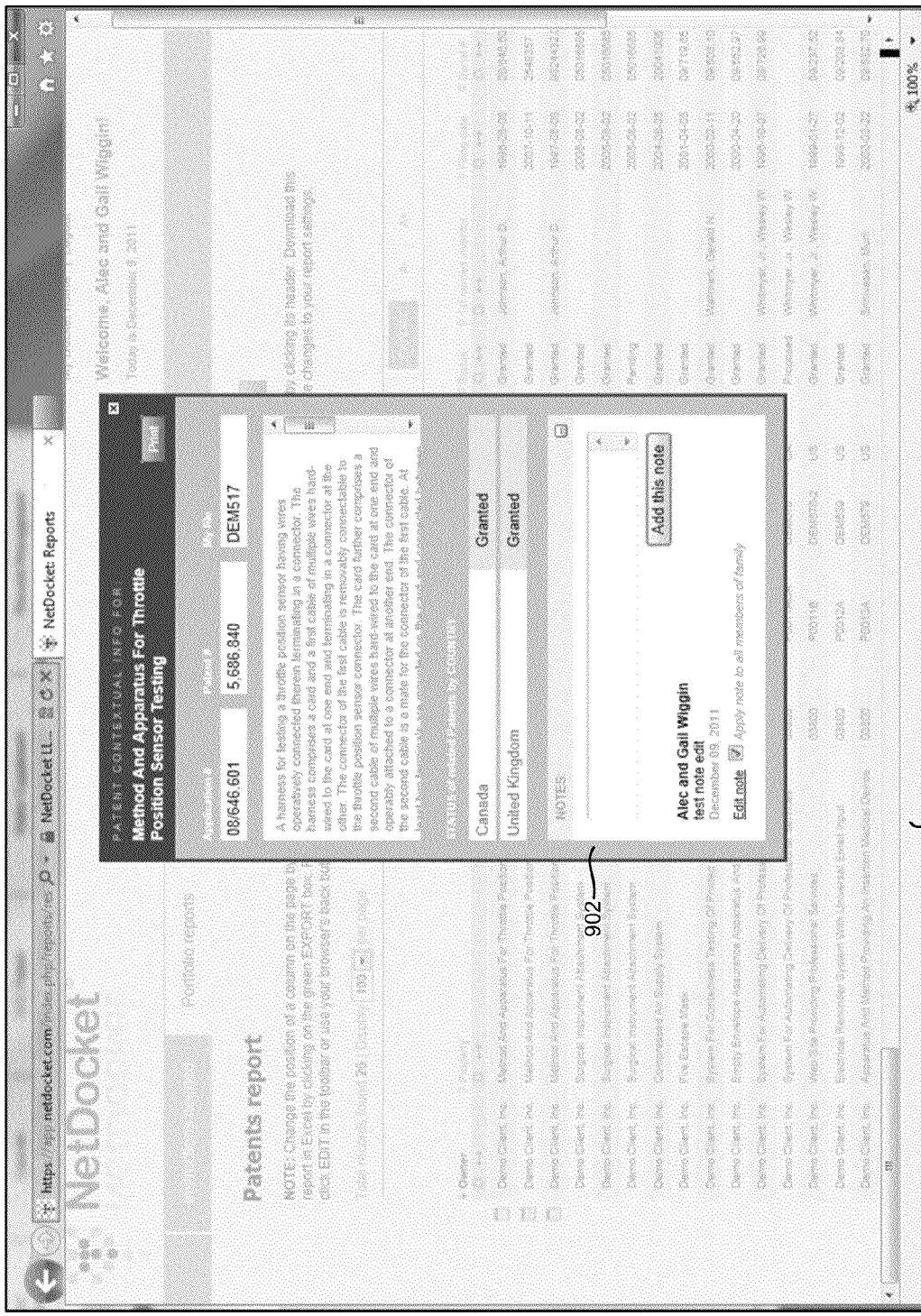
FIG. 9 illustrates a user interface generated by the system.

FIG. 9 shows a display 900 generated by the system with a pop up window 902. The window 902 is presented in response to a user clicking on or checking a box associated with the first one of the IP holdings shown in FIG. 8. The window 902 provides information about the IP holding and permits the entry of a comment or note. In the present example, the client submits a test note associated with a United States patent.

Figure 10:
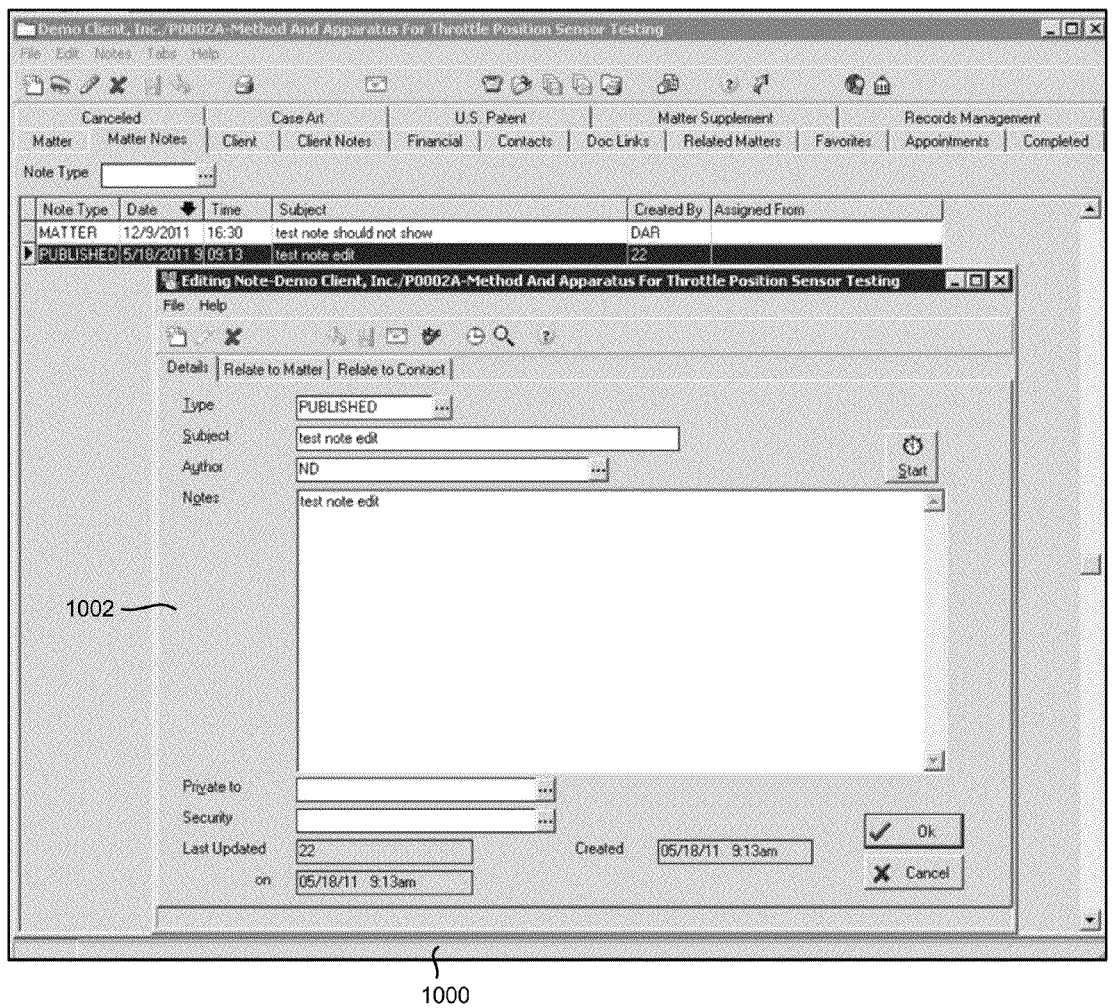
FIG. 10 illustrates a user interface generated by the system.
Figure 11:
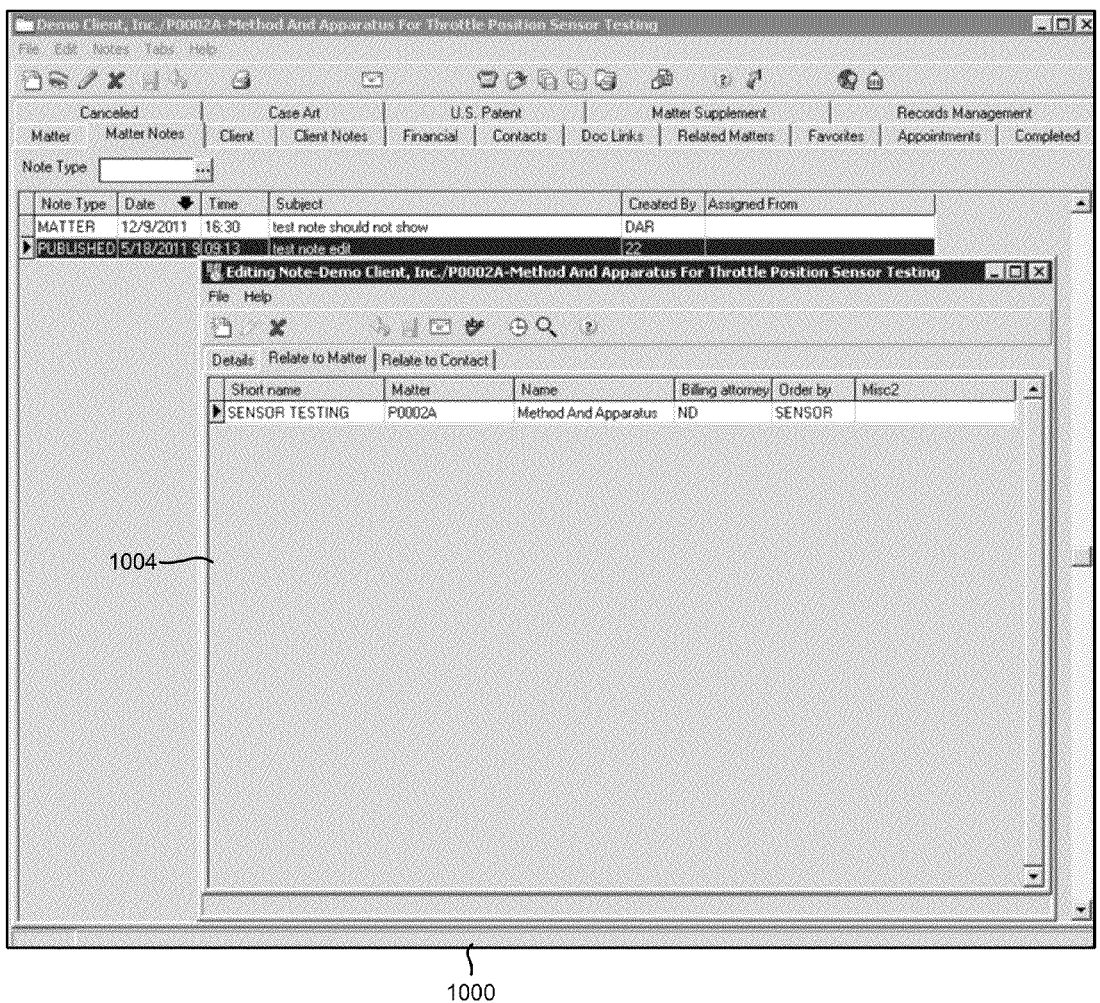
FIG. 11 illustrates a user interface generated by the system.
Figure 12:
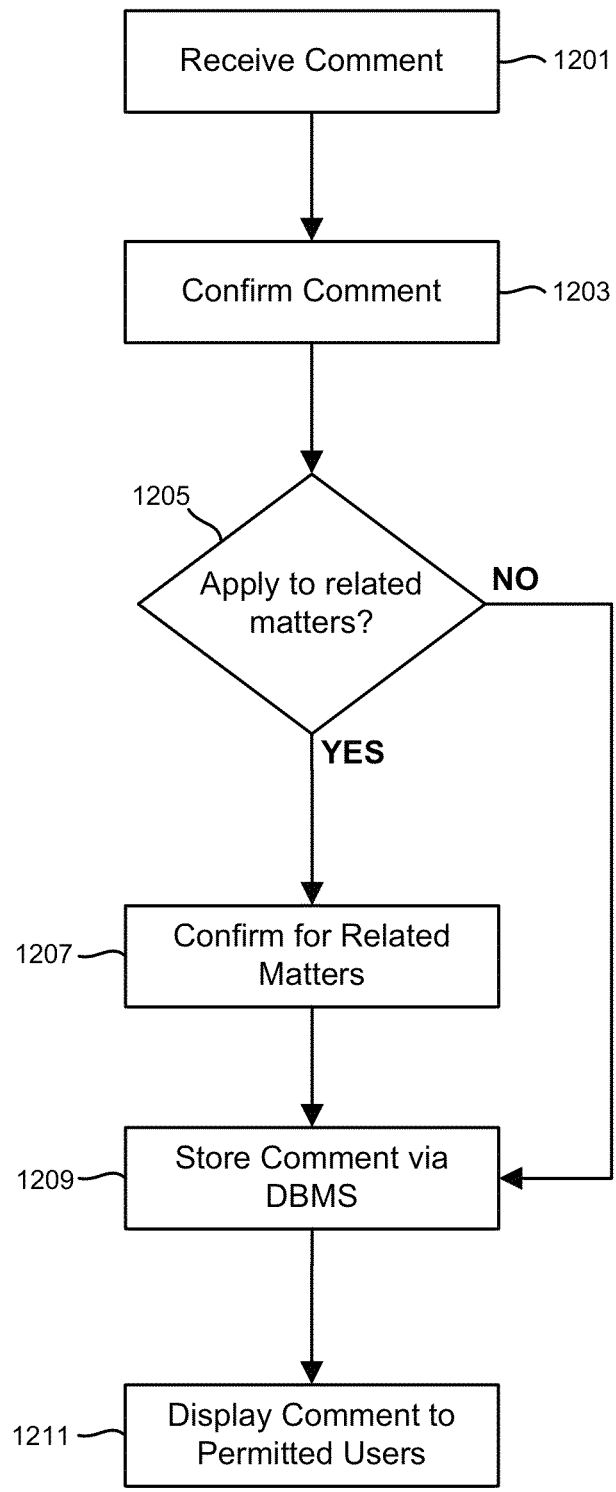
FIG. 12 shows a method for receiving and managing user comments via a website according to the present invention.

FIGS. 10-12 illustrate displays associated with the DBMS 24. Comments entered by users via the website are stored in a notes portion or database of the DBMS 24. FIG. 10 shows a user interface 1000 with a note window 1002. The note window 1002 shows the name or ID number of the author or creator. In this example, the note was created by an author with the initials "ND" and a client log-in code "22." The comment may be designated in the DBMS 24 with a type, such as "matter" or "published." In this embodiment, matter type notes are viewable via the DBMS 24 only and are not published via the website. Notes designated as "published" are displayed via the website to users with the requisite permissions to view the particular matters to which the note applies.

FIG. 11 illustrates another window 1004 with information about the matter to which the note relates. In the exemplary embodiment, the system only lists the primary matter in which the note was originally entered and not any family members to which the note was also applied to. However, the note appears with all of the family members on the website.

FIG. 12 shows a method for receiving and managing user comments via a website. The method includes receiving a comment or note via the website and/or website software (1201). The comment is confirmed, e.g., via a confirmation window (1203). If the client chooses to associate the comment with related matters, the comment is associated with related matters and confirmed (1205-1207). The comment is also stored in the DBMS 24 and/or associated databases 50 (1209). The comment is then displayed to subsequent users who access the website and have permission to view the comment (1211).

Although the invention has been described with reference to a particular arrangement of parts, features and the like, these are not intended to exhaust all possible arrangements or features, and indeed many modifications and variations will be ascertainable to those of skill in the art.

What is claimed is:

1. A system and website for delivering services via the internet, comprising:
   a server;
   a database comprising a plurality of data records corresponding to one or more clients;
   software executing on said server for generating and displaying reports of at least a portion of said data records to a client via the website;
   software executing on said server for displaying at least one input field via the website for receiving a comment pertaining to a first one of said data records;
   software executing on said server for storing a comment received via the input field;
   software executing on said server for displaying the comment via the website; and
   software executing on said server for managing access to the data records and comments, wherein viewing access to the comment via the website to is restricted to a first group of users and editing of the comment is restricted to a second group of users;
   wherein the reports include a list of the portion of data records, wherein a comment indicia is displayed adjacent to each data record for which a comment has been stored.

2. The system according to claim 1, wherein the first group of users consists of each a plurality of users at the client corresponding to the first one of said data records.

3. The system according to claim 1, wherein the second group of users consists of a client user from which the comment was received in the input field.

4. The system according to claim 1, further comprising:
   software executing on said server for editing the comment.

5. The system according to claim 1, wherein said server comprises database management software, wherein the comment is stored in said database and associated with the first data record by the database management software.

6. The system according to claim 1, wherein the database includes a profile for each of a plurality of client users, wherein the profiles include permission data identifying one or more clients accessible by the client users.

7. The system according to claim 6, wherein each of the profiles includes a user name, wherein said software for managing access determines access based on a user name entered via the at least one input field.

8. The system according to claim 1, wherein the database includes a profile for each of a plurality of client companies, wherein the profiles include permission data identifying data records accessible by client users at the client companies.

9. A system and website for delivering services via the internet, comprising:
   a server;
   a database comprising a plurality of data records corresponding to one or more clients;
   software executing on said server for generating and displaying reports of at least a portion of said data records to a client via the website;
   software executing on said server for displaying at least one input field via the website for receiving a comment pertaining to a first one of said data records;
   software executing on said server for storing a comment received via the input field;
   software executing on said server for displaying the comment via the website; and software executing on said server for managing access to the data records and comments, wherein viewing access to the comment via the website to is restricted to a first group of users and editing of the comment is restricted to a second group of users;

wherein said server comprises database management software, wherein the comment is stored in said database and associated with the first data record by the database management software, wherein the database includes comments published via the website and unpublished comments.

10. A system and website for delivering services via the internet, comprising:

a server;

a database comprising a plurality of data records corresponding to one or more clients;

software executing on said server for generating and displaying reports of at least a portion of said data records to a client via the website;

software executing on said server for displaying at least one input field via the website for receiving a comment pertaining to a first one of said data records;

software executing on said server for storing a comment received via the input field;

software executing on said server for displaying the comment via the website; and software executing on said server for managing access to said data records and comments, wherein viewing access to the comment via the website to is restricted to a first group of users and editing of the comment is restricted to a second group of users;

wherein each of said data records include data regarding an intellectual property holding.

11. The system according to claim 10, wherein at least one of the data records is associated with one or more related data records.

12. The system according to claim 10, wherein each of the reports include at least a title, owner, and jurisdiction for each of the intellectual property holdings.

13. A system and website for delivering services via the internet, comprising:

a server;

a database comprising a plurality of data records corresponding to one or more clients;

software executing on said server for generating and displaying reports of at least a portion of said data records to a client via the website;

software executing on said server for displaying at least one input field via the website for receiving a comment pertaining to a first one of said data records;

software executing on said server for storing a comment received via the input field;

software executing on said server for displaying the comment via the website;

software executing on said server for managing access to the data records and comments, wherein viewing access to the comment via the website to is restricted to a first group of users and editing of the comment is restricted to a second group of users; and software for exporting a report for storage on a client computer, wherein the exported report includes the comment.

14. A method for receiving and displaying comments via a website, comprising the steps of:

generating, via software executing on a server, a report of at least a portion of a plurality of data records stored in a database;

displaying, via software executing on the server, the report to a first user;

displaying an input field for receiving comments pertaining to at least one of the data records listed in the report;

receiving a first comment via the input field pertaining to a first one of the data records;

storing the first comment received via the input field;

displaying the first comment via the website, wherein the first comment is viewable by the first user and each of a plurality of second users associated with a same client, wherein the first comment is editable by only the client;

displaying a user selection field on the website to apply the first comment to a plurality of data records related to the first data record;

receiving a user selection in the user selection field; and storing the first comment with each of a plurality of data records associated with the first data records.

15. The method according to claim 14, further comprising the steps of:

receiving a user identifier inputted via the website;

wherein the one or more data records and the comments accessible by the first user are determined according to the user identifier.

16. The method according to claim 14, further comprising the step of:

displaying a comment indicia in the report adjacent to each data record for which a comment has been stored.

17. The method according to claim 14, further comprising:

receiving edits to the comment.

18. The method according to claim 14, wherein each of the data records including data regarding an intellectual property holding.

* * * * *